US010017406B2

(12) United States Patent
Reid et al.

(10) Patent No.: US 10,017,406 B2
(45) Date of Patent: Jul. 10, 2018

(54) UPFLOW CONTINUOUS BACKWASH FILTER

(71) Applicants: John H. Reid, Fredericksburg, VA (US); Wade Tanner, Fredericksburg, VA (US)

(72) Inventors: John H. Reid, Fredericksburg, VA (US); Wade Tanner, Fredericksburg, VA (US)

(*) Notice: Subject to any disclaimer, the term of this patent is extended or adjusted under 35 U.S.C. 154(b) by 612 days.

(21) Appl. No.: 14/044,491

(22) Filed: Oct. 2, 2013

(65) Prior Publication Data
US 2015/0090659 A1    Apr. 2, 2015

(51) Int. Cl.
*B01D 24/28* (2006.01)
*B01D 24/46* (2006.01)
*C02F 3/12* (2006.01)
*C02F 3/22* (2006.01)
*C02F 3/10* (2006.01)
*C02F 3/28* (2006.01)
*C02F 3/30* (2006.01)
*C02F 1/00* (2006.01)

(52) U.S. Cl.
CPC ........... *C02F 3/1221* (2013.01); *C02F 3/107* (2013.01); *C02F 3/1215* (2013.01); *C02F 3/2826* (2013.01); *C02F 3/305* (2013.01); C02F 2001/007 (2013.01); C02F 2203/002 (2013.01); C02F 2209/42 (2013.01); C02F 2303/16 (2013.01); Y02E 50/343 (2013.01); Y02W 10/15 (2015.05)

(58) Field of Classification Search
CPC .... B01D 24/4689; B01D 23/10; B01D 23/24; C02F 1/001; C02F 3/1221; C02F 3/2826
USPC .... 210/137, 108, 195.3, 265, 269, 744, 792, 210/97
See application file for complete search history.

(56) References Cited

U.S. PATENT DOCUMENTS 4,284,508 A    8/1981   Jewell
5,112,504 A    5/1992   Johnson
(Continued)

FOREIGN PATENT DOCUMENTS

EP    0 514 774 A1    11/1992
GB    1 399 515 A     7/1975
JP    2000-70990 A    3/2000

OTHER PUBLICATIONS

Extended European search report of the European Patent Office dated Sep. 18, 2015 in corresponding European patent application EP 14187422.2.
Search report of the GB Patent Office dated Apr. 1, 2015 in corresponding British patent application GB1417419.7.
Partial search report of the European Patent Office dated Feb. 3, 2015 in corresponding European patent application 14187422.2-1351.
Blue Water Technologies, "Denitrification Enhanced Nutrient Removal (ENR) Blue Nite^TM", www.blueh2o.net internet brochure, two pages.
Parkson, "DynaSand^R Continuous, Upflow, Granular Media Filter", www.parkson.com, internet brochure, copyright 2009 Parkson Corporation, four pages.
(Continued)

*Primary Examiner* — Claire A Norris
(74) *Attorney, Agent, or Firm* — Walter Ottesen, P.A.

(57) ABSTRACT

An upflow continuous backwash deep bed sand filter (UCBF) having a recycle line for returning carbonaceous denitrifying bacteria attached to biomass to the influent of the UCBF. The recycle line returns the biomass to the treatment process at a location upstream of the upflow continuous backwash filter. Further, a liquid level control unit is provided that reduces fluctuations and significant drop in the liquid level upstream of the upflow continuous backwash filter, thereby avoiding or minimizing flow turbulences, air induction, and undesirable wastewater aeration resulting in the need to dose excessive carbon source to remove dissolved oxygen in the aerated wastewater.

12 Claims, 4 Drawing Sheets

(56) References Cited

U.S. PATENT DOCUMENTS

| | | | |
|---|---|---|---|
| 5,415,771 A | 5/1995 | Krofta | |
| 6,630,071 B1 | 10/2003 | Buisman et al. | |
| 6,638,422 B1 | 10/2003 | Schwartzkopf | |
| 7,381,336 B2 | 6/2008 | Stedman | |
| 7,662,287 B2 | 2/2010 | Janssen et al. | |
| 8,080,163 B2 | 12/2011 | Moller et al. | |
| 2007/0017867 A1* | 1/2007 | Pedros | C02F 3/06 210/615 |
| 2007/0163958 A1 | 7/2007 | Newcombe et al. | |
| 2007/0187329 A1* | 8/2007 | Moller | C02F 1/288 210/670 |
| 2009/0294370 A1* | 12/2009 | Roberts | B01D 21/0012 210/694 |
| 2011/0005284 A1* | 1/2011 | Conner | C02F 3/1268 71/12 |

OTHER PUBLICATIONS

Enrivonmental Operating Solutions, Inc. "MicroC1000^TM", internet brochure, one page.

Satterfield, Z. et al, "Tech Brief Filter Backwashing", Fall 2005, vol. 5, Issue 3, published by The National Environmental Services Center at West Virginia University, four pages.

Office action of the European Patent Office dated Feb. 14, 2017 in corresponding European patent application EP 14187422.2.

* cited by examiner

UPFLOW CONTINUOUS BACKWASH FILTER

FIELD OF THE DISCLOSURE

An upflow continuous backwash deep bed denitrification sand filter is disclosed that comprises a recycle line for returning carbonaceous bacteria attached to biomass to the upstream or inlet of the sand filter. Further, a liquid level control unit is provided that reduces fluctuations in the liquid level upstream of the upflow continuous backwash denitrification filter, thereby avoiding or minimizing flow turbulences, air induction, and undesirable wastewater aeration, which can result in significantly increased supplemental carbon source dosage requirements and cost.

BACKGROUND

Upflow continuous backwash filters (UCBF's) employ a sand bed through which wastewater ascends. During this process, suspended solids are removed and the treated wastewater collects in a filtrate trough and flows out as treated effluent. Sand, the filter medium, which has caught suspended solids is drawn from the bottom of the UCSF through an air lift pipe and cleaned while ascending together with air and water. The sand is separated from the wastewater at a separation section and then further cleaned with filtered water flowing upwards while the sand falls down through a cleaning section. Thereafter, the sand is uniformly scattered across the top surface of the sand bed by a sand distributor creating a fresh layer of sand capable of filtering suspended solids.

UCBF's provide a stable treatment process for providing filtered water. The wastewater treatment process operates on a continuous cleaning principle, producing stable and good-quality filtered water under a constant pressure drop. UCBF's have the capability to filter highly contaminated wastewater. Due to their simple structure requiring little supplementary equipment, maintenance of UCBF's is straightforward and operating costs are comparatively low.

Nevertheless, in view of ever more stringent limits on pollutants that may be contained in purified drinking water, a demand exists for UCBF's that can remove larger amounts of pollutants from wastewater, in particular to remove nitrogen present as nitrate or nitrite. However, it is often necessary to add consumables, such as a carbon source, to the wastewater to increase the nitrogen removal efficiency of the carbonaceous bacteria. Hence, it is desirable to reduce the amounts of consumables necessary for removal of pollutants, especially in view of a potential price increase of these consumables over the operating life of a UCBF.

The upflow continuous backwash filters known from the related art, however, have certain disadvantages. For example, the typical operation of a related art UCBF creates inefficiencies in the nitrate nitrogen removal process because the sand media cleaning process that occurs in the continuous backwash upflow column pipe not only scrubs the sand media but also removes the carbonaceous bacteria that grow on the biomass of the sand media from the wastewater treatment process. FIG. 1 of U.S. Pat. No. 7,381,336 provides for a system in which reject from washer 82 is discharged through an outlet port 46. The reject is therefore removed from the system depicted in FIG. 1 of U.S. Pat. No. 7,381,336. Moreover, U.S. Pat. No. 7,381,336 provides for a method in which mechanical agitation and turbulence caused by the action of the air bubbles in air-lift pump 76 are so intense that microorganisms are killed. Such a system is, therefore, not suitable for recycling of microorganisms.

SUMMARY OF THE DISCLOSURE

Disclosed herein is a filter influent distribution channel and an upflow continuous backwash filter system that comprises a clarifier basin; a clarifier effluent collection trough being disposed to receive an overflow of wastewater from the clarifier basin; optionally, a filter influent flocculation tank; an upflow continuous backwash filter being disposed to receive the wastewater influent from the clarifier effluent collection trough or the filter influent flocculation tank through a filter influent distribution channel and an upflow continuous backwash filter influent pipeline; and a denitrifying bacteria recycle return line being disposed to receive a return flow from a rejection compartment of the upflow continuous backwash filter.

Further, a method of operating an upflow continuous backwash filter is disclosed, which comprises receiving an overflow of a wastewater influent from a clarifier basin in a clarifier effluent collection trough; optionally, receiving an outflow of the wastewater influent from the clarifier effluent collection trough in a filter influent flocculation tank; receiving an inflow of the wastewater influent from the clarifier effluent collection trough or the filter influent flocculation tank into a filter influent distribution channel and into individual upflow continuous backwash filters; applying hydrostatic pressure to push the wastewater influent from the main filter influent distribution channel into the individual upflow continuous backwash filters; and, returning filter reject backwash wastewater from a rejection compartment of the upflow continuous backwash filter and/or from a mixed liquor inflow line or clarifier sludge return inflow line through a denitrifying bacteria recycle return line to a location upstream of the upflow continuous backwash filter.

In addition, an upflow continuous backwash filter system is disclosed, which comprises a clarifier basin; a clarifier effluent collection trough being disposed to receive an overflow of wastewater from the clarifier basin; optionally, a filter influent flocculation tank being disposed to receive an outflow of wastewater from the clarifier effluent collection trough; a liquid level control unit having a wastewater storage reservoir or filter influent distribution channel and at least one automatic filter influent positioning valve, the liquid level control unit being disposed to receive the wastewater influent from the clarifier effluent collection trough or the filter influent flocculation tank; and a main filter influent distribution pipeline or channel being disposed to receive the wastewater influent from the liquid level control unit.

Moreover, a method of operating an upflow continuous backwash filter is disclosed, which comprises receiving an overflow of a wastewater influent from a clarifier effluent collection trough or from a filter influent flocculation tank; receiving an outflow of the wastewater influent into a filter influent distribution channel of a liquid level control unit having at least one filter influent positioning valve; and maintaining a liquid level of the wastewater influent in the clarifier effluent collection trough or the filter influent flocculation tank or filter influent distribution channel within a predetermined range.

It is one aspect of the disclosure herein to provide a wastewater treatment system including a filter influent pump station, a denitrifying bacteria recycle pump station or reject backwash wastewater collection-recycle pump station to capture the bacteria solids scrubbed from the sand media during the continuous upflow backwash process and/or receive a mixed liquor inflow and/or RAS inflow and to recycle these solids back to the inlet or influent of the denitrifying filters.

It is another aspect of this disclosure to provide a wastewater treatment system including a liquid level control unit for maintaining a headdrop between the clarifier basin and the continuous upflow backwash filter.

BRIEF DESCRIPTION OF THE DRAWINGS

The invention will now be described with reference to the drawings wherein.

DESCRIPTION OF THE BEST AND VARIOUS EMBODIMENTS

Figure 1:
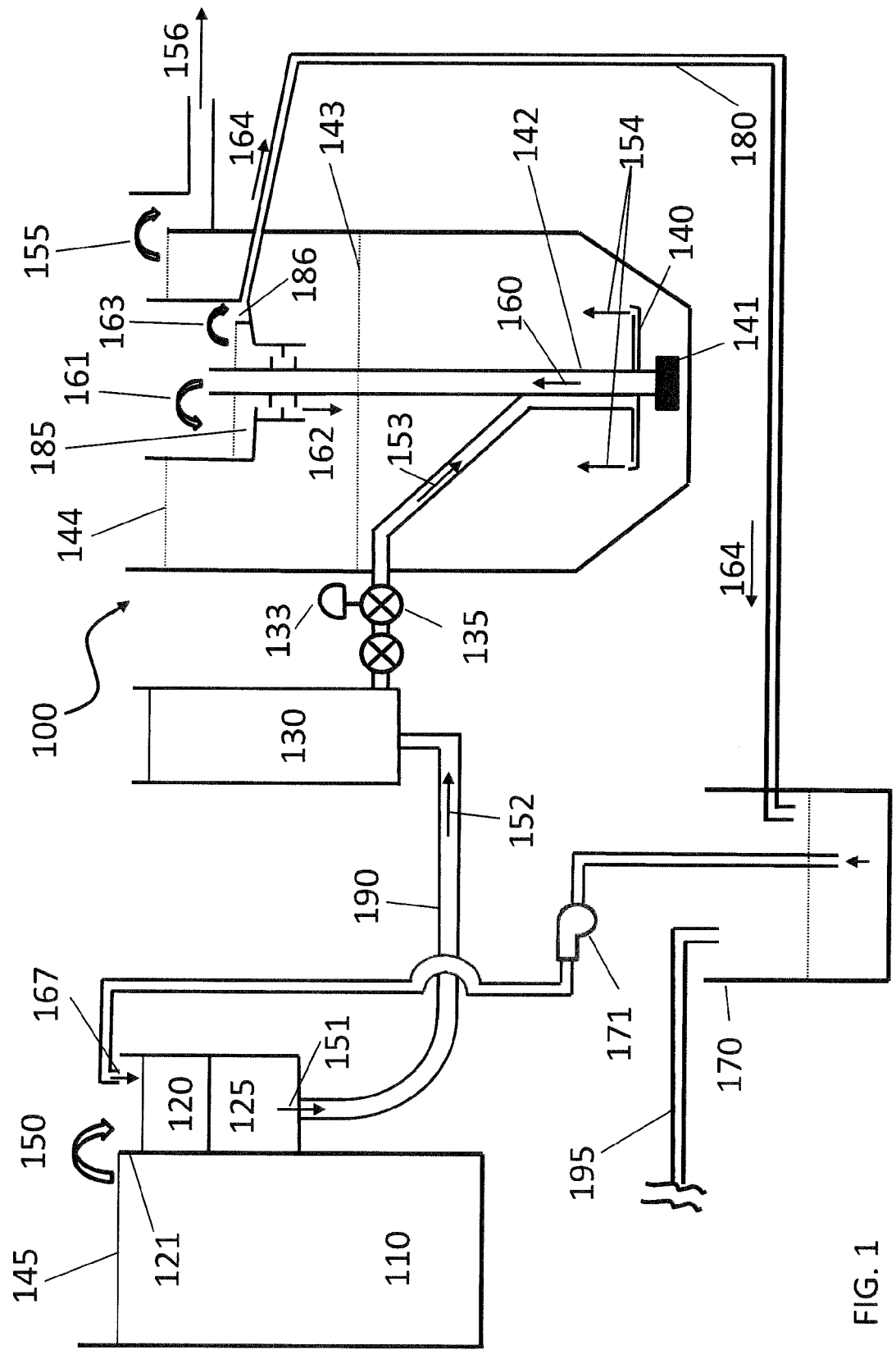
FIG. 1 depicts a schematic view of a wastewater treatment system including an upflow continuous backwash filter 100 and a recycle line 180.

The foregoing and other objects, aspects, and advantages will be better understood from the following detailed description of the best and various embodiments. Throughout the various views and illustrative embodiments of the present disclosure, like reference numbers are used to designate like elements.

In a particular embodiment, the bacteria recycle return line comprises a reject backwash wastewater collection recycle pump station. In another particular embodiment, the elevation of the liquid level of wastewater in the clarifier effluent collection trough or the filter influent flocculation tank relative to the liquid level in the upflow continuous backwash filter is less than or equal to a predetermined value in order to reduce hydraulic headdrop and consequent wastewater aeration and resultant increased dissolved oxygen concentration in the wastewater as the wastewater flows by gravity from the clarifier effluent collection trough into the filter influent distribution channel, i.e., the elevation of a liquid level of wastewater in the clarifier effluent collection trough or the filter influent flocculation tank over a liquid level in the filter influent distribution trough is minimized to a predetermined value and preferably less than or equal to 1.0 ft, as required to transfer wastewater flow from the clarifier effluent trough to the filter influent distribution channel.

Typically, the location upstream of the upflow continuous backwash filter is the filter influent flocculation tank. Also typically, a dosed amount of a carbon source solution and returned filter reject backwash wastewater containing wastewater denitrifying bacteria are mixed with the wastewater influent to obtain a mixture and the mixture is reacted in the filter influent flocculation tank.

In a typical embodiment, the location upstream of the upflow continuous backwash filter is selected from the group consisting of a main filter structure influent pipeline, the main filter influent distribution channel, and an individual upflow continuous backwash filter influent pipeline from among one or more upflow continuous backwash filter influent pipelines.

With particularity, a concentration of dissolved oxygen at an intake port of the upflow continuous backwash filter is less or the same as the concentration of dissolved oxygen within the clarification effluent collection trough. Specifically, the inclusion of the liquid level control unit prevents or substantially reduces the amount of oxygen transferred to the wastewater prior to its inflow into the backwash filter. Thus, by avoiding an increase of dissolved oxygen in the wastewater a desired anoxic low dissolved oxygen concentration is maintained such that the denitrification process can be effectively and efficiently achieved.

Also with particularity, maintaining the liquid level comprises automatically adjusting the automatic filter influent positioning valve to maintain a relatively constant liquid level in the clarifier effluent collection trough or the filter influent flocculation tank air filter influent distribution channel. Relatively constant herein means that the liquid level of the wastewater is maintained preferably within a range of from 90% to 110% of a starting level, more preferably within a range of from 95% to 105% of a starting level.

In another particular embodiment, the concentration of dissolved oxygen in the filter influent distribution trough of the upflow continuous backwash filter is of from 0.0 to 0.3 mg/L. In yet another particular embodiment, a carbon source solution is added to the influent wastewater prior to the inflow into the upflow continuous backwash filter. With particularity, the carbon source solution comprises a member selected from the group consisting of methanol, high quality waste glycerin, sugar-based waste products or acetic acid, or a mixture thereof. However, it is also possible to add commercially available carbon sources for wastewater denitrification, such as MicroC™ from Environmental Operating Solutions, Inc., or PolySweet™ from Polytec, Inc. Also with particularity, the carbon source is added in an amount of from 2 mg/L to 5 mg/L per mg/L nitrate nitrogen to the filter wastewater influent.

In a typical embodiment, the filter influent flocculation tank is selected as the location upstream of the upflow continuous backwash filter. In another typical embodiment, a dosed carbon source solution and wastewater denitrifying bacteria contained in the returned filter reject backwash wastewater with the wastewater influent are mixed to obtain a mixture, and the mixture is reacted in the filter influent flocculation tank.

Turning to the drawings, FIG. 1 shows a preferred embodiment of an upflow continuous backwash filter wastewater treatment system. Wastewater having liquid level 145 flows from a clarifier basin 110 over a clarifier basin weir 121 into a clarifier effluent trough 120 in the direction of arrow 150. The clarifier effluent trough is provided with a dropbox 125 from where wastewater enters an upflow continuous backwash filter influent pipeline 190, as indicated by arrow 151. Thereafter, the wastewater having a direction of flow as indicated by arrow 152 enters the filter influent flow distribution channel. The outflow from the liquid level control unit is regulated by valve 135, which is automatically adjusted by flow regulator 133. The operation of the liquid level control unit is explained in more detail with regard to FIG. 2. From the liquid level control unit, wastewater flows in the direction of arrow 153 through a filter influent flow inlet distribution pipe 140, which opens into the base of upflow continuous backwash filter 100. Wastewater enters in the direction of arrows 154 into the flow influent zone of the backwash filter 100, which is filled with a filtering medium, typically sand, up to filtering media fill level 143. However, other filtering media, such as gravel, alumina or silica may also be employed.

Nevertheless, it is preferred to use sand as the filtering medium. The wastewater is pushed through the filtering medium inside the backwash filter by hydrostatic pressure, which results from the elevation of liquid level or differences in height of the fill levels within the liquid level control unit 130 and the fill level 144 of the treated effluent in the backwash filter. The sand in the sand bed scrubs off biomass and total suspended solids (TSS) from the wastewater during the rise of the wastewater through the sand bed. Further, carbonaceous bacteria grow in the biomass in the filter sand media, which play a pivotal role in the nitrogen removal process taking place in the sand bed. Treated effluent, which is now free of biomass, continuously flows over a weir as indicated by arrow 155 into an exit pipeline 156.

Biomass accumulates on the sand and would, if not removed, hinder the ability of the sand to provide the required hydraulic filtering capacity and remove TSS from wastewater entering the backwash filter. Thus, a center column backwash upflow pipe 142 is provided, which uses air lift pumping to draw dirty sand medium from the bottom of the filter (flow influent zone) through a sand media scrubbing-mixing pipe column 141. The air lift 160 pushes sand upwards towards its discharge end and into a sedimentation zone 185, as indicated by arrow 161. While in the air lift, sand is subjected to agitation which loosens and removes biomass from the sand's surface, thereby regenerating the sand for further biomass removal by providing accessible surface area for biomass attachment. In the sedimentation zone 185 adjacent to the discharge end of the air pipe, backwash wastewater called reject water is separated from the backwashed or cleaned sand. Discharged sand returns to the sand bed after cascading through a return funnel in the direction of arrow 162.

Figure 3:
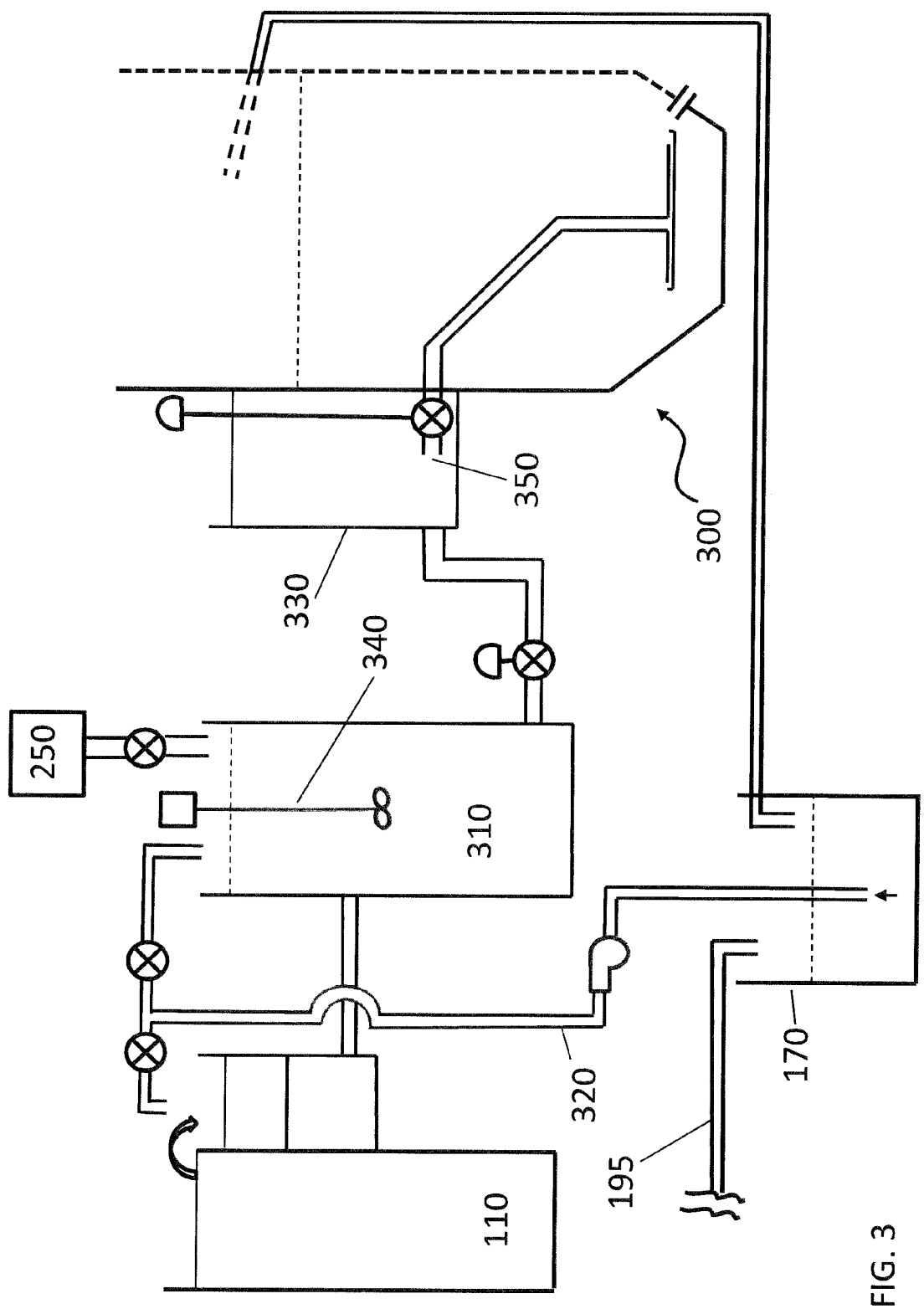
FIG. 3 depicts a schematic view of a wastewater treatment system including a filter influent flocculation tank 310 and a recycle line 320.

A small portion of rising water entering the return funnel in countercurrent further cleanses the cascading sand. Biomass and largely untreated wastewater obtained in the sedimentation zone will be referred to herein as reject water. Specifically, reject water is discharged on the top of the filter bed into rejection compartment 186, as indicated by arrow 163, and conducted by gravity flow as indicated by arrow 164 through denitrifying bacteria recycle return line 180 to a reject backwash wastewater collection-recycle pump station, which includes a recycle return tank 170 and a wastewater pump 171. The reject water is pumped by the wastewater pump 171 of the reject wastewater collection pump station upstream to the main filter clarification trough 120, as indicated by arrow 167. However, the reject backwash wastewater collection-recycle pump station may also be disposed to pump the reject water to the clarifier basin or to a filter influent flocculation tank 310 as depicted in FIG. 3. Optionally, biomass from a mixed liquor flow line and/or a return activated sludge (RAS) flow line 195 may be added to the reject backwash wastewater collection-recycle pump station.

This continuous backwash filter design avoids known inefficiencies found in UCBF's of the related art, which merely collect the reject water for disposal. By contrast, in a wastewater treatment system in accordance with a preferred embodiment of this disclosure, the undesirable bacteria wasting process is eliminated. Thus, the concentration and mass of attached growth bacteria present in the filter sand media increases, which allows for efficient nitrate nitrogen removal by biological denitrification. This disclosure provides a means to collect the filter reject backwash wastewater from all or part of the UCBF's to the filter influent pump station wet well during operation and recycle this reject flow as a denitrifying bacteria sludge recycle flow either to the main filter structure influent pipeline, to the filter influent trough, or to the individual filter influent feed pipelines. Thereby, the continuous scrubbing and loss or wasting of denitrifying bacteria is avoided, and the denitrifying bacteria population weight can be built up much faster and controlled at a higher level or concentration in the UCBF sand media.

Figure 2:
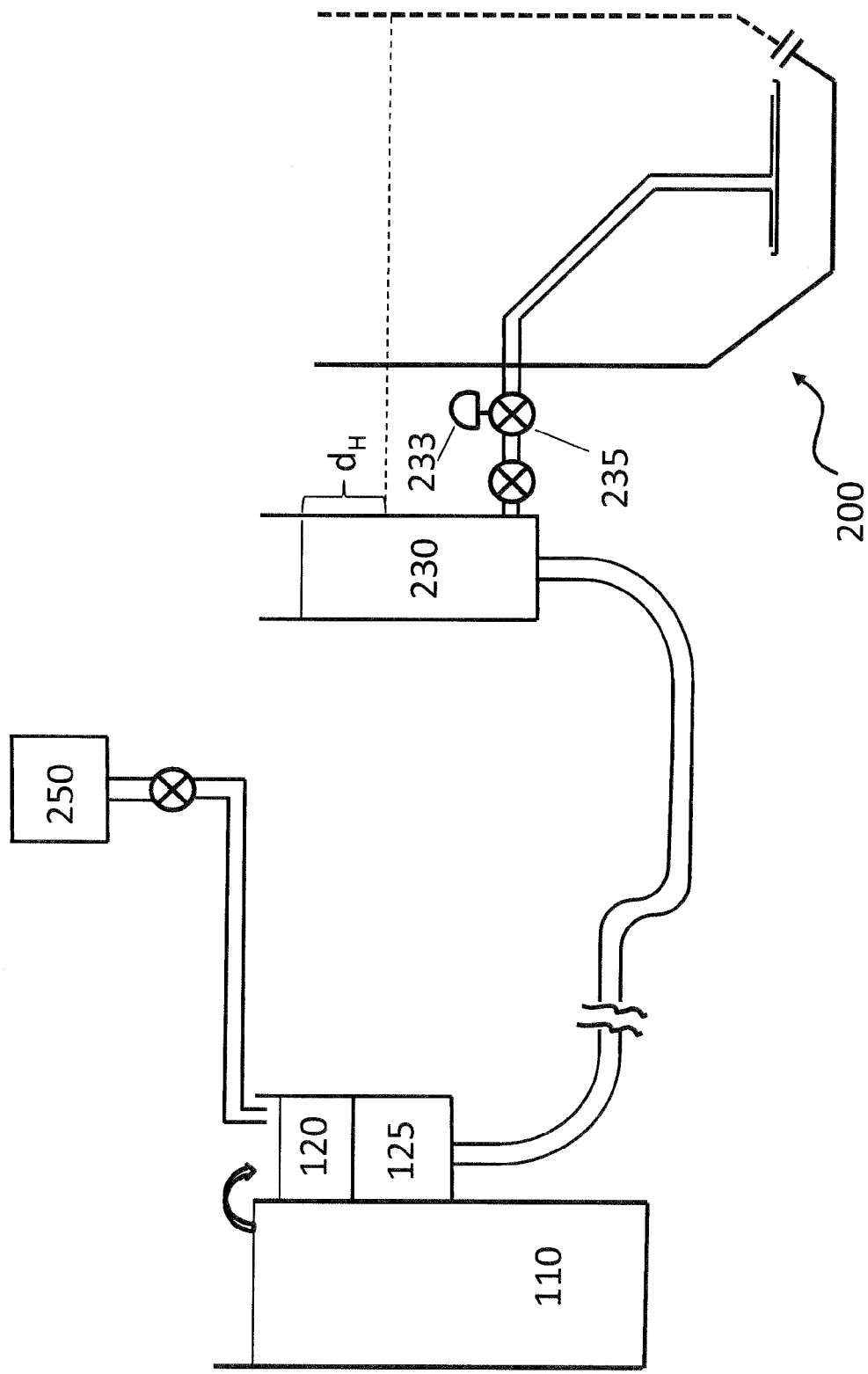
FIG. 2 depicts a schematic view of a wastewater treatment system including a clarifier basin 110, an upflow continuous backwash filter 200, and a liquid level control unit 230.

FIG. 2 depicts another preferred embodiment of the disclosure. Wastewater flows from a clarifier basin 110 into a main filter clarification trough 120 and the dropbox 125 as described above with respect to FIG. 1. A filter influent flocculation tank (not depicted) may optionally be provided downstream of the clarification trough. Subsequently, the wastewater flows into a liquid level control unit 230. Valve 235 is automatically adjusted by flow regulator 233 to maintain a headrop between the wastewater level within the liquid level control unit and the clarifier effluent trough 120. Further, a carbon source solution is stored in storage container 250 and can be metered into the main filter clarification trough 120.

The operating principle of backwash filters 200 and 300 corresponds to backwash filter 100. For clarity, the system components within continuous upflow backwash filters 200 and 300 are largely omitted and/or depicted with dashed lines. Further, while not depicted, it is within the scope of the disclosure herein to provide a bacteria recycle line for the preferred embodiment of FIG. 2.

Another aspect of the UCBF's herein is that the liquid level in the main filter influent trough should be designed to be able to rise to about 1.2 m (approximately four feet) to provide adequate hydraulic head to force wastewater through the filters at design maximum or peak wastewater flow rates or when the filter influent wastewater has higher suspended solids concentrations. To provide this necessary available hydraulic head in the filtration process, a hydraulic profile results which requires a typical liquid level drop or fall of about 1.5 m (approximately 5 feet) or more from the final clarifiers or clarification process into the UCBF. Preferably, the hydraulic head is of from about 0.9 m to about 1.8 m and more preferably of from about 1.2 m to about 1.5 m. However, in UCBF's without a liquid level control unit this liquid level drop causes flow turbulence, air induction, and undesirable wastewater aeration that raises the dissolved oxygen (DO) concentration upstream of the UCBF process influent wastewater from several parts per million up to 4 mg/L to 7 mg/L and thereby interferes with the denitrification process which requires a low DO concentration of 0.0 to 0.3 mg/L. In order to achieve satisfactory denitrification in the filters, this DO concentration must be reduced by excess dosage of methanol or other suitable carbon source solutions into the UCBF process influent wastewater flow, for example by metering in carbon source solution from storage container 250.

This disclosure provides a wastewater treatment system and a method for treating wastewater that significantly reduce this undesirable aeration and high DO concentration in the influent wastewater flow of the related art UCBF design and thereby increase the growth rate of denitrifying attached growth bacteria in the filter. This disclosure further provides a liquid level control device to automatically maintain a relatively constant high liquid level in the filter influent trough between low and high or peak filter influent flow rates and thereby minimize the liquid level drop between the final clarifier(s) and the UCBF units. By minimizing this liquid level fall or drop relative to the liquid level drop of a UCBF having no liquid level control unit, the aeration or oxygen transferred into the filter influent wastewater will be minimized and the DO concentration will be significantly reduced. It is thereby possible to eliminate the need to dose excess carbon source chemical solution into the UCBF influent flow to remove dissolved oxygen by aerobic bacteria growth, and, to minimize the carbon source chemical solution dosage necessary to achieve the required final effluent nitrate and nitrite nitrogen concentration.

FIG. 3 depicts another preferred embodiment in which a filter influent flocculation tank 310 is provided between the clarifier basin and the backwash filter 300 having liquid level control unit 330. Toward the bottom of the liquid level control unit a filter influent distribution channel 350 is provided. The liquid level in the filter influent distribution channel which distributes flow into the backwash filter is controlled by the filter influent valves. Inside the flocculation tank small particles in the wastewater coagulate and then adhere to each other to form flocculated suspended aggregate. In this embodiment, the recycle line 320 returns the reject water to denitrifying bacteria recycle return tank 170. Further, biomass from a mixed liquor flow line and/or a return activated sludge (RAS) flow line 195 may optionally be added to the tank 170. The biomass contained in the mixed liquor or the RAS ultimately reaches the UCBF to replenish biomass lost in the scrubbing. The effluent from the recycle return tank 170 is pumped to the filter influent flocculation tank with the aid of pump 171. Accordingly, in a preferred embodiment of the disclosure, a wastewater treatment system is provided that includes a recycle line and a liquid level control unit.

In the preferred embodiment shown in FIG. 3, an optional mixer 340 may be installed. In one aspect of this disclosure, the flocculation tank is operated as a reactor tank by mixing a dosed amount of carbon source solution from storage container 250 and wastewater denitrifying bacteria contained in the returned filter reject backwash wastewater recycled with recycle line 320 with the wastewater influent flowing in from clarifier basin 110. The resulting mixture is then reacted in the filter influent flocculation tank 310.

Figure 4:
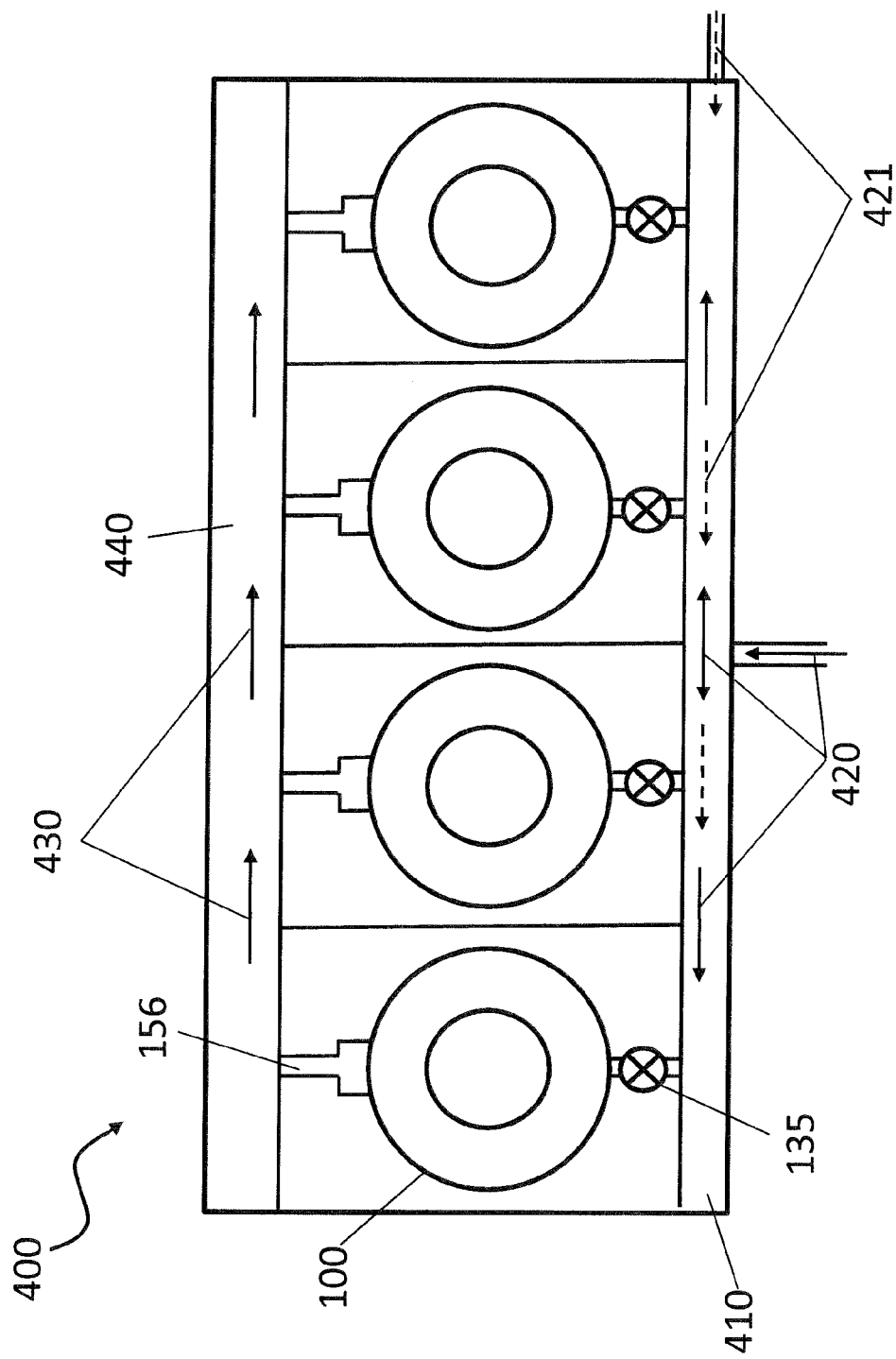
FIG. 4 depicts an overhead view of an upflow continuous backwash filter system having a plurality of upflow continuous backwash filters 100 in a concrete filter structure.

In FIG. 4 a concrete filter system structure 400 is depicted in which four upflow continuous backwash filters 100 are arranged. However, it is also possible to provide fewer than four or more than four filters. This plurality of filters is arranged to receive wastewater from a filter influent distribution channel 410 common to all four filters. The wastewater may, for example, be an effluent received from filter influent flocculation tank 310. The location for the filter influent pipeline for the concrete filter system structure is not particularly limited. For example, effluent may enter the structure 400 from the mid-point of the filter influent distribution channel 410 and flow to all four filters following solid arrows 420 or effluent may enter from the side and flow through filter influent distribution channel 410 in the direction of dashed arrows 421. Each upflow continuous backwash filter is provided with a manual on-off flow valve. However, multiple automatic valves, which automatically control and throttle the effluent, may also be provided to maintain a relatively constant liquid level in the filter influent distribution channel 410 to back up the liquid level control in the flocculation tank and/or clarifier effluent collection trough to minimize wastewater aeration upstream of the filters. The filter influent distribution channel 410 can, therefore, be operated as a liquid level control unit. However, it is also possible to operate the flocculation tank upstream of the filter influent distribution channel as a liquid level control unit.

In the concrete filter system structure each individual upflow continuous backwash filter has a designated filter influent valve 135 and influent pipeline. Treated effluent is discharged through exit pipeline 156 into a filter effluent collection channel 440 common to all four upflow continuous backwash filters where a combined treated effluent flow 430 can be collected.

Further, a method of maintaining a population of denitrifying biomass in an upflow continuous backwash filter is provided, which comprises providing the filter influent flocculation tank; adding a dosed amount of a carbon source solution to the filter influent flocculation tank; mixing the dosed amount of the carbon source solution with the return flow from the rejection compartment of the upflow continuous backwash filter with a mixer provided in the filter influent flocculation tank; adjusting an amount of the return flow from the rejection compartment to maintain a predetermined population of denitrifying biomass; and, optionally, disposing a portion of the return flow from the rejection compartment as waste activated sludge (WAS) or as discarded filter reject wastewater flow in order to prevent at least one of an excessive solids accumulation and a hydraulic pressure drop in filter media of the upflow continuous backwash filter.

In a preferred embodiment, the embodiment shown in FIG. 3 may be operated to maintain a population of denitrifying biomass. Specifically, the embodiment of FIG. 3 is operated in a process akin to return activated sludge (RAS) wastewater treatment by recycling filter reject flow like return from the denitrifying filters backwash wastewater back into the filter influent flocculation tank or filter influent distribution channel in order to maintain a desired or required weight or population of denitrifying biomass into the denitrifying filter system in which biomass must also be wasted like a waste activated sludge (WAS) flow or discarded filter reject wastewater flow in order to prevent excessive solids accumulation and hydraulic pressure drop or headloss through the same filter media.

In the context of this disclosure, the flow of wastewater through the treatment system can be viewed as a stream flowing from the main filter structure influent pipeline, and in turn, the clarifier basin, the collection trough, optionally the flocculation tank, optionally the liquid level control unit, the main filter influent distribution channel, and the filter bed. Thus, the term upstream is a relative term that for a given system component refers to a location of the wastewater treatment system from where the wastewater is directly or indirectly received, whereas the term downstream refers to a location to which the wastewater will flow from the given system component. The embodiments described hereinabove are further intended to explain best modes known of practicing the disclosure and to enable others skilled in the art to utilize the disclosure in such, or other, embodiments and with the various modifications required by the particular applications or uses. Accordingly, the description is not intended to limit it to the form disclosed herein. Also, it is intended that the appended claims be construed to include alternative embodiments.

The foregoing description of the disclosure illustrates and describes the present disclosure. Additionally, the disclosure shows and describes only the preferred embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purpose, as if each individual publication, patent or patent application were specifically and individually indicated to be incorporated by reference. In the case of inconsistencies, the present disclosure will prevail.

What is claimed is:

1. An upflow continuous backwash filter system for biological anoxic conditions, comprising
   a clarifier basin;
   a clarifier effluent collection trough being disposed to receive an overflow of wastewater from the clarifier basin;
   optionally, a filter influent flocculation tank;
   an upflow continuous backwash filter containing a population of denitrifying biomass on a filter medium and being disposed to receive the wastewater influent from the clarifier effluent collection trough or the filter influent flocculation tank through an upflow continuous backwash filter influent distribution channel and filter influent pipeline;
      a denitrifying bacteria recycle return tank being disposed to receive a return flow from a rejection compartment of the upflow continuous backwash filter, and, optionally, to receive an influent from a mixed liquor inflow line or a return activated sludge (RAS) inflow line; and
   a conduit for recycling said denitrifying bacteria from said denitrifying bacteria recycle return tank to said clarifier effluent collection trough or said filter influent flocculation tank or both.

2. The system according to claim 1, wherein the denitrifying bacteria recycle return tank comprises a reject backwash wastewater collection—recycle pump station.

3. The system according to claim 1, wherein an elevation of liquid level of wastewater in the clarifier effluent collection trough or the filter influent flocculation tank relative to the liquid level in the filter influent distribution channel is less than or equal to a predetermined value in order to reduce hydraulic headdrop and consequent wastewater aeration and resultant increased dissolved oxygen concentration in the wastewater as the wastewater flows by gravity from the clarifier effluent collection trough or the filter influent flocculation tank into the filter influent distribution channel and then into the upflow continuous backwash filter.

4. The system according to claim 3, wherein the predetermined value of the elevation of liquid level is less than or equal to 1.0 ft.

5. The system according to claim 1, which further comprises the filter influent flocculation tank.

6. The system according to claim 5, which further comprises a mixer located in the filter influent flocculation tank.

7. The system according to claim 1, wherein the denitrifying bacteria recycle return tank is also disposed to receive an influent from the mixed liquor inflow line or the return activated sludge (RAS) inflow line.

8. An upflow continuous backwash filter system, comprising:
   a clarifier basin;
   a clarifier effluent collection trough being disposed to receive an overflow of wastewater from the clarifier basin;
   optionally, a filter influent flocculation tank being disposed to receive an outflow of wastewater from the clarifier effluent collection trough;
   a liquid level control unit having a wastewater storage reservoir and at least one automatic filter influent positioning valve, the liquid level control unit being disposed to receive the wastewater influent from the clarifier effluent collection trough or the filter influent flocculation tank;
   a main filter influent distribution pipeline or channel being disposed to receive the wastewater influent from the liquid level control unit;
   a denitrifying bacteria recycle return tank being disposed to receive a return flow from a rejection compartment of the upflow continuous backwash filter, and, optionally, to receive an influent from a mixed liquor inflow line or a return activated sludge (RAS) inflow line; and
   a conduit for recycling said denitrifying bacteria from said denitrifying bacteria recycle return tank to said clarifier effluent collection trough or said filter influent flocculation tank or both.

9. The system according to claim 8, wherein an increase in concentration of dissolved oxygen from the clarification effluent collection trough or filter influent flocculation tank to an upflow continuous backwash filter inlet flow is equal to or less than 1.0 mg/L.

10. The system according to claim 8, which further comprises the filter influent flocculation tank and wherein the filter influent flocculation tank is disposed to receive an outflow of wastewater from the clarifier effluent collection trough.

11. The system according to claim 10, which further comprises a mixer located in the filter influent flocculation tank.

12. The system according to claim 8, wherein the liquid level control unit is capable of automatically maintaining a relatively constant liquid level of 90% to 110% of a starting level in the filter influent flocculation tank or clarifier effluent collection trough between low, high and peak influent flow rates.

* * * * *